(12) United States Patent
Akado

(10) Patent No.: US 11,579,819 B2
(45) Date of Patent: Feb. 14, 2023

(54) STORAGE MEDIUM, INFORMATION PROCESSING APPARATUS, AND CONTROL METHOD OF INFORMATION PROCESSING APPARATUS

(71) Applicant: CANON KABUSHIKI KAISHA, Tokyo (JP)

(72) Inventor: Yukinobu Akado, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/495,921

(22) Filed: Oct. 7, 2021

(65) Prior Publication Data

US 2022/0137889 A1    May 5, 2022

(30) Foreign Application Priority Data

Oct. 30, 2020    (JP) .............................. JP2020-182779

(51) Int. Cl.
*G06F 3/12* (2006.01)

(52) U.S. Cl.
CPC ............ *G06F 3/1208* (2013.01); *G06F 3/121* (2013.01); *G06F 3/1256* (2013.01); *G06F 3/1286* (2013.01)

(58) Field of Classification Search
CPC ...... G06F 3/1208; G06F 3/121; G06F 3/1256; G06F 3/1286; G06F 3/1255; G06F 3/1285

USPC ......................................................... 358/1.15
See application file for complete search history.

(56) References Cited

U.S. PATENT DOCUMENTS

| | | | |
|---|---|---|---|
| 7,265,868 B2 * | 9/2007 | Takahashi | H04N 1/3935 358/1.6 |
| 8,164,765 B2 * | 4/2012 | Anno | G06F 3/1285 358/1.18 |
| 2019/0130234 A1 * | 5/2019 | Kaneda | G06F 3/1203 |

FOREIGN PATENT DOCUMENTS

JP    2009-033419 A    2/2009

* cited by examiner

*Primary Examiner* — Darryl V Dottin
(74) *Attorney, Agent, or Firm* — Venable LLP

(57) ABSTRACT

An information processing apparatus acquires printing setting information including at least information on a sheet type relating to mounted sheets and information on a sheet width, which correspond to each sheet feed unit in a printing apparatus capable of feeding sheets from a plurality of sheet feed units, creates a first item for designating a plurality of sheet feed units whose both sheet type and sheet width are the same among sheet feed units of the printing apparatus, and a second item for designating a sheet feed port for which there does not exist another sheet feed unit whose both sheet type and sheet width are the same, and creates a print job in a case where a user designates the first item, the print job including a command for the printing apparatus to automatically select a sheet feed unit from among the plurality of sheet feed units included in the first item.

10 Claims, 14 Drawing Sheets

| | 500 | 501 | 502 | 503 | 504 | 505 | 506 |
|---|---|---|---|---|---|---|---|
| ID | PRINTER NAME | SHEET FEED PORT | SHEET WIDTH | SHEET TYPE | AUTOMATIC FLAG | NUMBER OF REMAINING SHEETS |
| ID-A | PRINTER 1 | ROLL 1 | 24 IN. | PLAIN PAPER | | 5m |
| ID-B | PRINTER 1 | ROLL 2 | 36 IN. | COATED PAPER | | 10m |
| ID-C | PRINTER 1 | CUT SHEET | A2 | PLAIN PAPER | | |
| ID-D | PRINTER 1 | ROLL 3 | NONE | NONE | | 20m |
| ID-E | PRINTER 2 | ROLL 1 | 24 IN. | PLAIN PAPER | ON | 10m |
| ID-F | PRINTER 2 | ROLL 2 | 24 IN. | PLAIN PAPER | ON | 4m |
| ID-G | PRINTER 2 | ROLL 3 | 24 IN. | PLAIN PAPER | ON | 2m |
| ID-H | PRINTER 2 | ROLL 4 | A2 | PLAIN PAPER | | 40m |
| ID-I | PRINTER 2 | ROLL 5 | 24 IN. | COATED PAPER | | 120m |

FIG.5

SHEET TO BE FED :

| |
|---|
| ROLL PAPER<br>AUTOMATIC : 24inch<br>　　　　PLAIN PAPER |
| ROLL PAPER : A2<br>　　　　PLAIN PAPER |
| ROLL PAPER : A2<br>　　　　COATED PAPER |

FIG.9

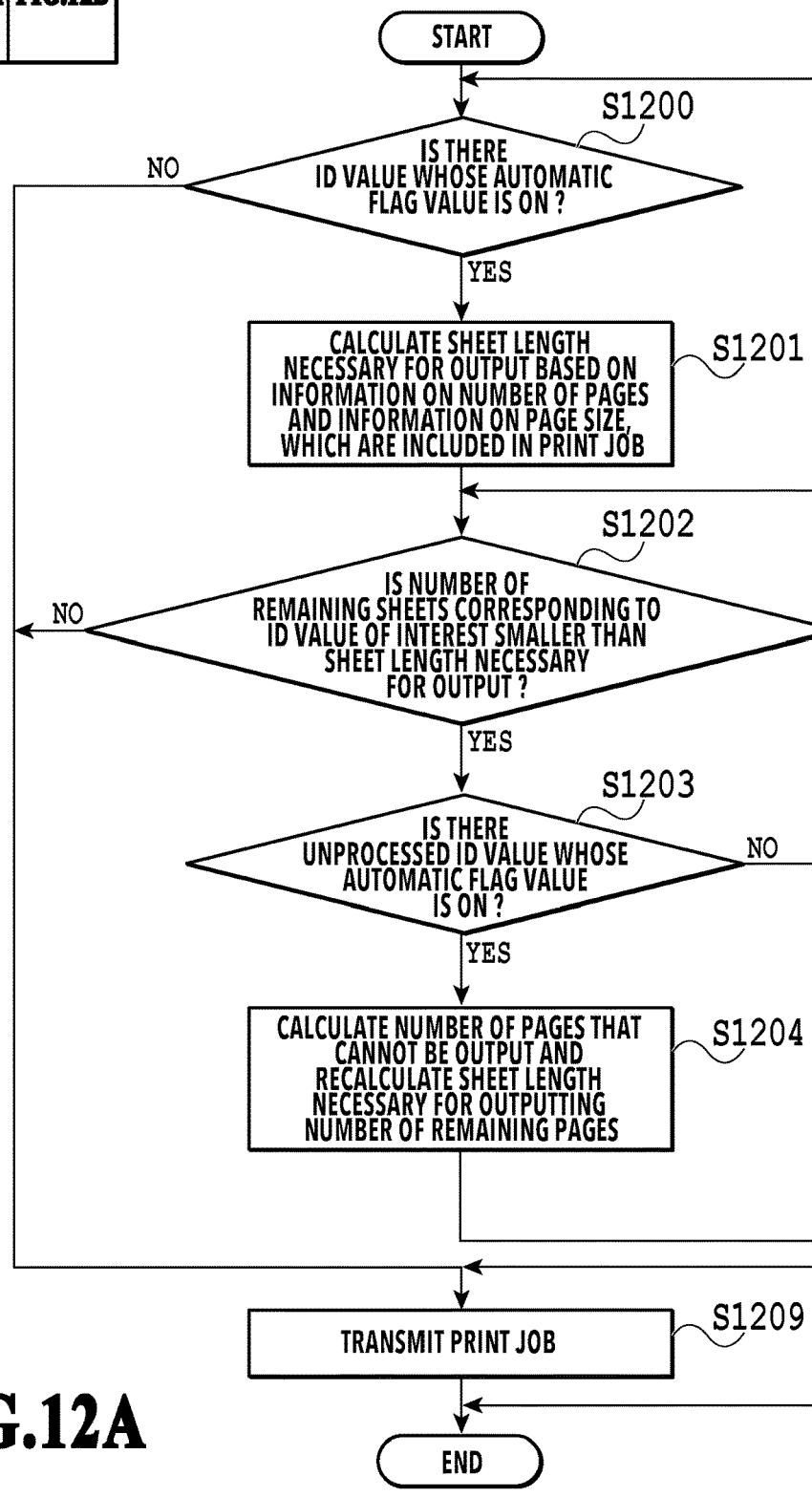

STORAGE MEDIUM, INFORMATION PROCESSING APPARATUS, AND CONTROL METHOD OF INFORMATION PROCESSING APPARATUS

BACKGROUND OF THE INVENTION

Field of the Invention

The present disclosure relates to a technique of continuous printing.

Description of the Related Art

An image output apparatus is known, which outputs output materials continuously (that is, without interruption) by feeding sheets across a plurality of sheet feed ports (that is, feeding sheets from a plurality of sheet feed ports) and performing printing in a case where the number of pages is large, a case where the number of remaining sheets is small in printing and output based on one certain print job. As the technique to output an output material continuously across a plurality of sheet feed ports, Japanese Patent Laid-Open No. 2009-033419 has disclosed a technique to perform combining printing by applying a different form for each size in a case where the size of the sheet of the sheet feed port is different at the time of continuous printing.

Further, as another technique, a technique is known which continues printing without interruption in a case where the same sheet size is set to a plurality of sheet feed ports on the side of the image output apparatus by specifying the size of the regular cut sheet that is mounted at the sheet feed port.

However, it is not possible to apply the above-described method of continuing printing by specifying the size of the cut sheet to a printer that prints roll paper (referred to as roll paper printer). The reason is that in a case of the roll paper printer, the sheet size changes in accordance with the position at which the roll paper is cut, and therefore, the sheet size is not determined uniquely.

In order to solve this problem, a technique is known in which an information processing apparatus creates a print job by using a command for automatically selecting the sheet feed port on the side of the image output apparatus, such as the roll paper printer, so that the size of an image to be printed is matched.

SUMMARY OF THE INVENTION

However, according to Japanese Patent Laid-Open No. 2009-033419, at the time of performing continuous printing in which sheets are fed from a plurality of sheet feed ports in an image output apparatus in which sheets of different sizes are mounted at a plurality of sheet feed ports, there is a case where the printing setting is not reflected appropriately, such as a case where the sheet of the size and type designated by a user is not used. Consequently, there is such a problem that image missing or a large margin not intended by a user occurs in an output material. Further, there is also such a problem that the color of an output material is different between different types of sheets because the amount of used ink is different for different types of sheets.

Consequently, in view of the above-described problem, an object of one embodiment of the present invention is to output an output material in accordance with the intention of a user by suppressing a failure in printing in a case where a printing apparatus capable of performing continuous printing in which sheets are fed from a plurality of sheet feed ports is used.

One embodiment of the present invention is a non-transitory computer readable storage medium storing a program for causing a computer of an information processing apparatus to function as: an acquisition unit configured to acquire printing setting information including at least information on a sheet type relating to mounted sheets and information on a sheet width, which correspond to each sheet feed unit in a printing apparatus capable of feeding sheets from a plurality of sheet feed units; a first creation unit configured to create a display item for a GUI on which it is possible to designate sheet feed units whose both sheet type and sheet width are the same en bloc among sheet feed units of the printing apparatus; and a second creation unit configured to create a print job in a case where a user designates the sheet feed units whose sheet type and sheet width are the same as an output destination via the display item, the print job including a command for the printing apparatus to automatically select a sheet feed unit from among the sheet feed units whose sheet type and sheet width are the same.

Further features of the present invention will become apparent from the following description of exemplary embodiments with reference to the attached drawings.

BRIEF DESCRIPTION OF THE DRAWINGS

FIG. 5 is a table in which printing setting information is stored;

FIG. 9 is a display based on sheet feed information generated by using the automatic flag;

FIG. 12 is a diagram showing the relationship of FIG. 12A and FIG. 12B;

FIG. 12A and FIG. 12B indicate a flowchart of printing execution processing accompanied by determination of whether it is possible to output all pages included in a print job on the sheet of the size desired by a user.

DESCRIPTION OF THE EMBODIMENTS

In the following, preferred embodiments of the present invention are explained in detail with reference to the attached drawings. The following embodiments are not intended to limit the present invention according to the scope of the claims and all combinations of features explained in the following embodiments are not necessarily indispensable as the solution of the present invention.

First Embodiment

<Configuration of Printing System>

Figure 1:
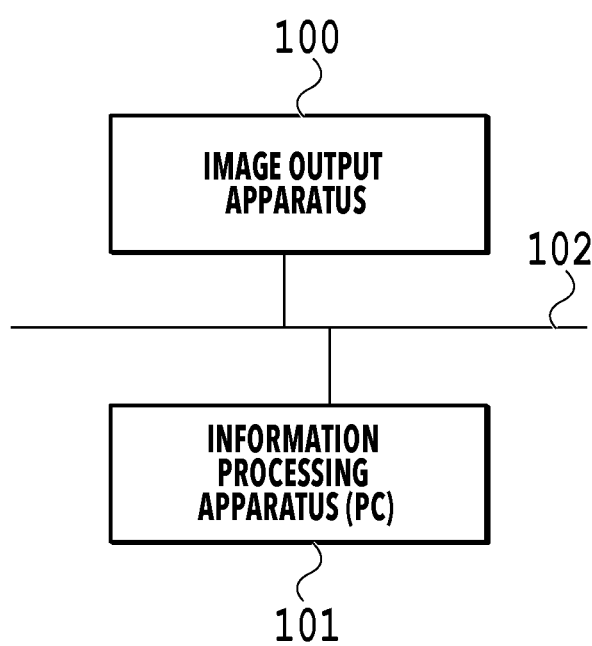
FIG. 1 is a block diagram showing a configuration of a printing system.

FIG. 1 is a block diagram showing an example of a configuration of a printing system in the present embodiment. As shown in FIG. 1, an image output apparatus 100 is capable of communicating with an information processing apparatus (in the following, PC) 101 capable of creating a print job via a network 102. The image output apparatus is also called an image printing apparatus and a printer. It is possible for the PC 101 to cause the image output apparatus 100 to perform printing by acquiring information relating to the width of a sheet that is fed to the image output apparatus 100 and transmitting a print job to the image output apparatus 100.

In the present embodiment, the configuration is such that the printing system has one image output apparatus, but the number of image output apparatuses of the printing system is not limited to one and the configuration may be one in which the printing system has two or more image output apparatuses. Similarly, as regards the PC, the configuration includes one PC, but the configuration may include two or more PCs. Further, in a case where the function of the PC is incorporated in the image output apparatus, the configuration may be one in which the printing system includes only the image output apparatus.

<Hardware Configuration of Image Output Apparatus>

Figure 2:
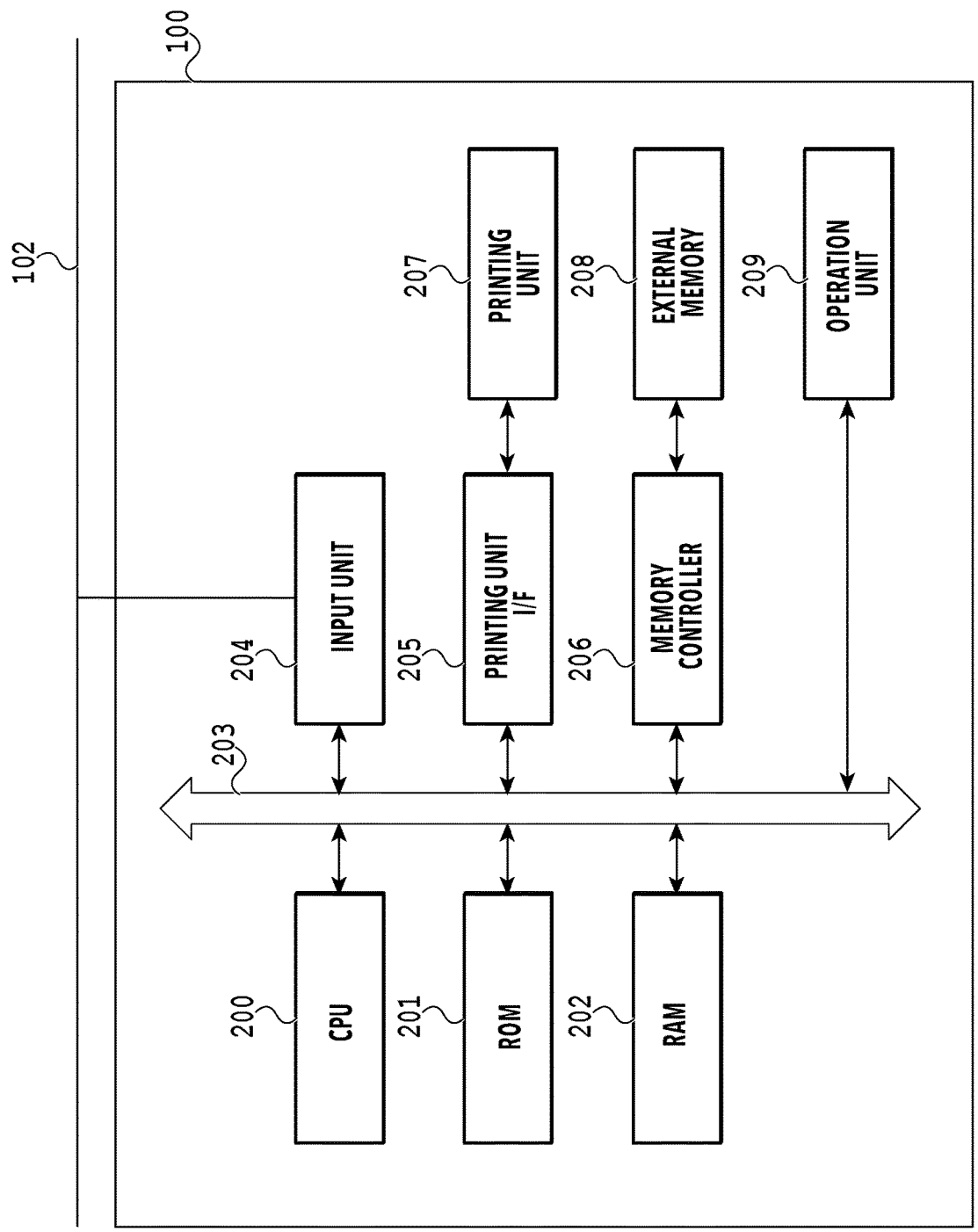
FIG. 2 is a block diagram showing a hardware configuration of an image output apparatus 100.

FIG. 2 is a block diagram showing an example of a hardware configuration of the image output apparatus 100. The image output apparatus 100 is controlled by a CPU 200. The CPU 200 operates based on control programs and the like stored in a ROM 201 or an external memory 208. The CPU 200 outputs an image signal as output information to a printing unit (specifically, printer engine) 207 connected to a printing unit I/F 205 via a system bus 203.

The CPU 200 is capable of communication processing with the PC 101 via an input unit 204 and capable of notifying the PC 101 of information indicating the state of the image output apparatus 100, information indicating the situation of printing processing, and the like. Further, it is possible for the CPU 200 to receive output data itself that is output to the printing unit 207 or data (for example, print job including printing setting information and image data, and the like) necessary to generate the output data via an input unit 204.

A RAM 202 is a RAM that functions as a main memory, a work area and the like of the CPU 200 and configured so that it is possible to increase the memory capacity by an optional RAM that is connected to an extension port, not shown schematically. The RAM 202 is used as an output information development area, an environment data storage area, a nonvolatile memory and the like.

The access to the external memory 208, such as a hard disk drive (HDD) and an IC card, is controlled by a memory controller 206. The external memory 208 is connected arbitrarily as needed and in which font data, emulation programs, form data, information relating to the sheet registered in the image output apparatus, sheet attribute information and the like are stored. Further, an operation unit 209 has a panel and is capable of displaying various kinds of information and it is possible for a user to give instructions to the image output apparatus 100 via the panel.

<Hardware Configuration of PC>

Figure 3:
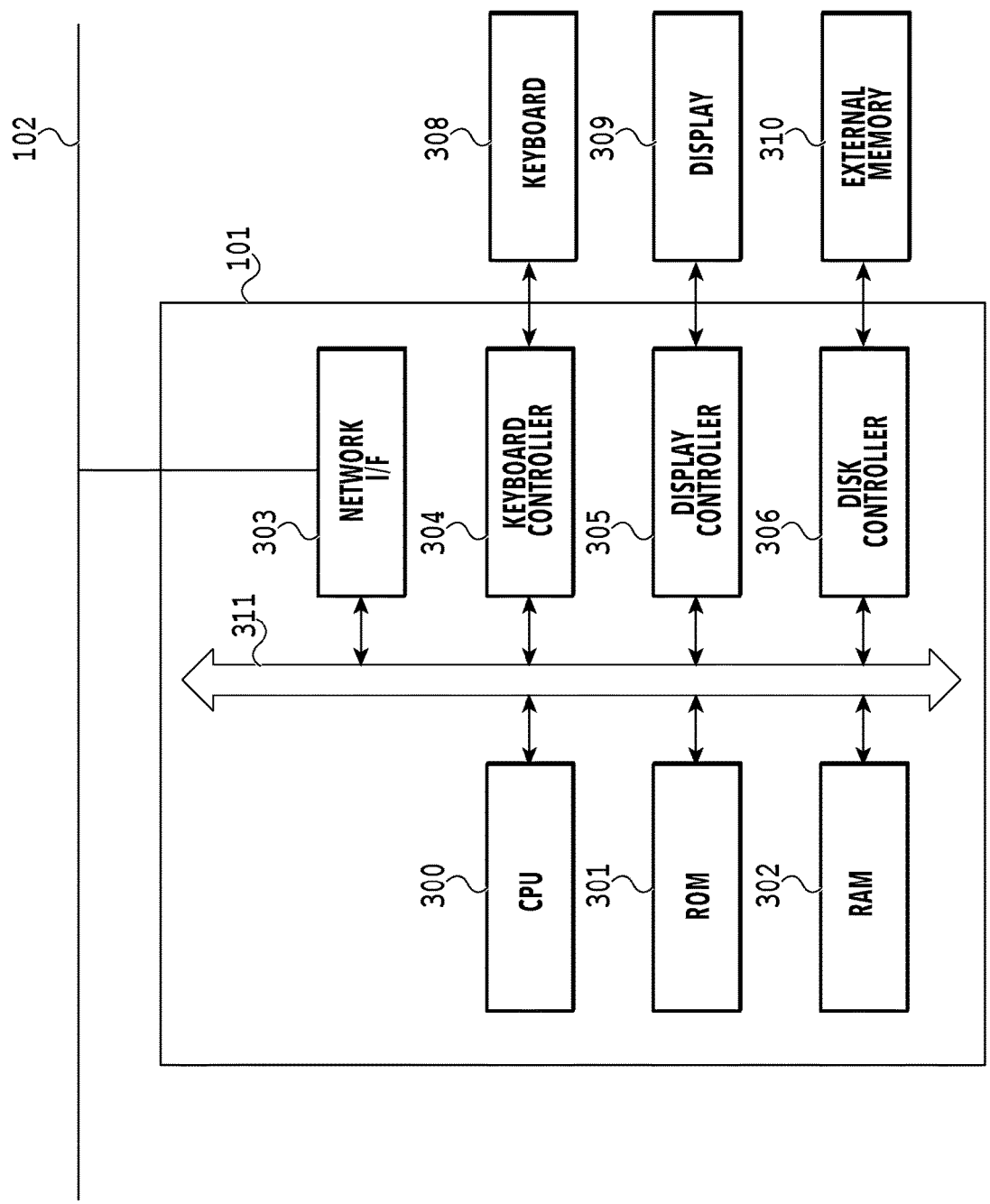
FIG. 3 is a block diagram showing a hardware configuration of a PC 101.

FIG. 3 is a block diagram showing an example of a hardware configuration of the PC 101 shown in FIG. 1. The PC 101 has a CPU 300, a ROM 301, a RAM 302, a network I/F 303, a keyboard controller 304, a display controller 305, and a disk controller 306.

The CPU 300 reads various programs, such as control programs, system programs, and application programs, from an external memory 310 via the disk controller 306 and loads the various read programs onto the RAM 302. The CPU 300 performs each piece of processing that is explained in the following, performs display control of a display 309, and so on by executing the various programs loaded onto the RAM 302. It may also be possible for the CPU 300 to read control programs and the like from the ROM 301 in place of the external memory 310 and use a dedicated circuit, such as an ASIC, in place of the CPU 300. The CPU 300 and the dedicated circuit are an example of a hardware circuit and a hardware processor.

The RAM 302 is configured so that it is possible to increase the capacity thereof by an optional RAM and the like, not shown schematically, and is mainly made use of as a work area of the CPU 300.

The keyboard controller 304 controls a key input from a keyboard 308 and a pointing device, not shown schematically. The display controller 305 controls the display of the display 309. The disk controller 306 controls the access to the external memory 310, such as an HD, CD-ROM, DVD-ROM, UDB, and MO. Further, it is possible for the CPU 300 to perform communication processing with the PC 101 via the network I/F 303.

In the present embodiment, unless stated otherwise particularly, the CPU 300 controls each unit connected to a main bus 311 via the main bus 311.

<Software Configuration of Printing System>

Figure 4:
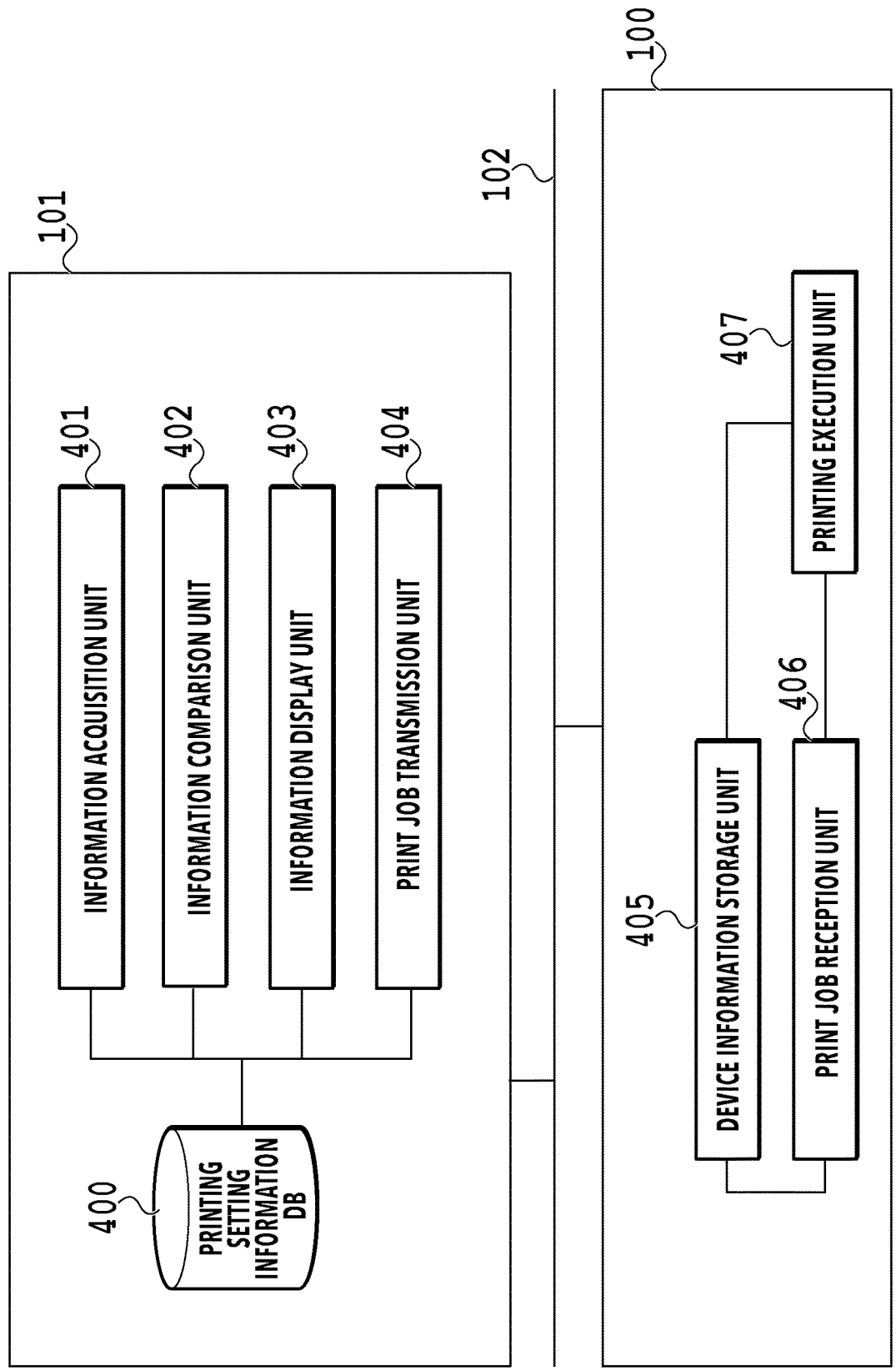
FIG. 4 is a function block diagram of the printing system.

FIG. 4 is a function block diagram showing an example of a software configuration of the printing system shown in FIG. 1. First, a software configuration of the image output apparatus 100 is explained. The image output apparatus 100 has a device information storage unit 405, a print job reception unit 406, and a printing execution unit 407. These modules are implemented by the hardware components of the image output apparatus 100, such as the CPU 200, the ROM 201, and the RAM 202.

The device information storage unit 405 stores information (referred to as state information on the image output apparatus 100) representing the state of the image output apparatus 100 in which the sheet feed situation and the device setting situation are reflected. The print job reception unit 406 receives the print job that is transmitted from the PC 101 and checks consistency between the received print job and the information stored in the device information storage unit 405. In a case where the results of the check of consistency indicate that there is no problem, the printing execution unit 407 performs printing processing based on the print job received by the print job reception unit 406.

Next, a software configuration of the PC 101 is explained. The PC 101 has a printing setting information database (abbreviated to printing setting information DB) 400, an information acquisition unit 401, an information comparison unit 402, an information display unit 403, and a print job transmission unit 404. These modules are part of the function modules of the application that performs printing in cooperation with a printer driver. For example, the printing setting information DB 400 is implemented by the hardware components of the PC 101, such as the ROM 301, the RAM 302, or the external memory 310. Further, the information acquisition unit 401, the information comparison unit 402, the information display unit 403, and the print job transmission unit 404 are implemented by the hardware components of the PC 101, such as the CPU 300.

In the printing setting information DB 400, the state information on the image output apparatus 100, which is acquired by the information acquisition unit 401, and information that is acquired from the printer driver and the OS installed in the PC 101 are stored. The information display unit 403 creates a GUI screen for displaying the printing setting information based on the printing setting information stored in the printing setting information DB 400 and displays the created GUI screen on the display 309. Further, the information display unit 403 stores the printing setting value that is changed by the user input via this GUI screen in the printing setting information DB 400. Furthermore, the information display unit 403 requests the print job transmission unit 404 to create a print job and transmit the created print job to the image output apparatus 100. The information comparison unit 402 performs verification of the information, such as comparison between the information stored in the printing setting information DB 400 and the printing setting value that is input via a GUI 600, to be described later. Then, the information comparison unit 402 requests the information display unit 403 to display warning information based on the verification results. Due to this, for example, a message to the effect that the number of remaining sheets is insufficient is displayed on the display 309. This will be explained in detail in a second embodiment.

<Printing Setting Information>

FIG. 5 is a diagram showing an example of a table that stores printing setting information stored in the printing setting information DB 400. The table shown in FIG. 5 has, as setting items, ID 500, Printer Name 501, Sheet Feed Port 502 that is a sheet feed unit, Sheet Width 503, Sheet Type 504, Automatic Flag 505, and Number of Remaining Sheets 506. In the record (row) in this table, printing setting information for each ID for uniquely identifying printing setting information is described and the printing setting information is used to create the GUI screen 600 (see FIG. 6), to be described later. In particular, the flag value indicating whether or not to display "Roll Paper Automatic" on the GUI screen 600 being described in the column of Automatic Flag 505 is one of important features of the present embodiment. The GUI screen 600 and "Roll Paper Automatic" will be described later.

As shown in FIG. 5, in the present embodiment, the seven types of setting items are provided, but of course it is possible to adopt a setting item other than those and increase the type of setting item within the table. Further, here, the aspect is shown in which all the printing setting information is managed by one table, but it may also be possible to prepare a table for each setting value relating to a specific setting item (for example, first table corresponding to Printer 1 and second table corresponding to Printer 2).

Figure 6:
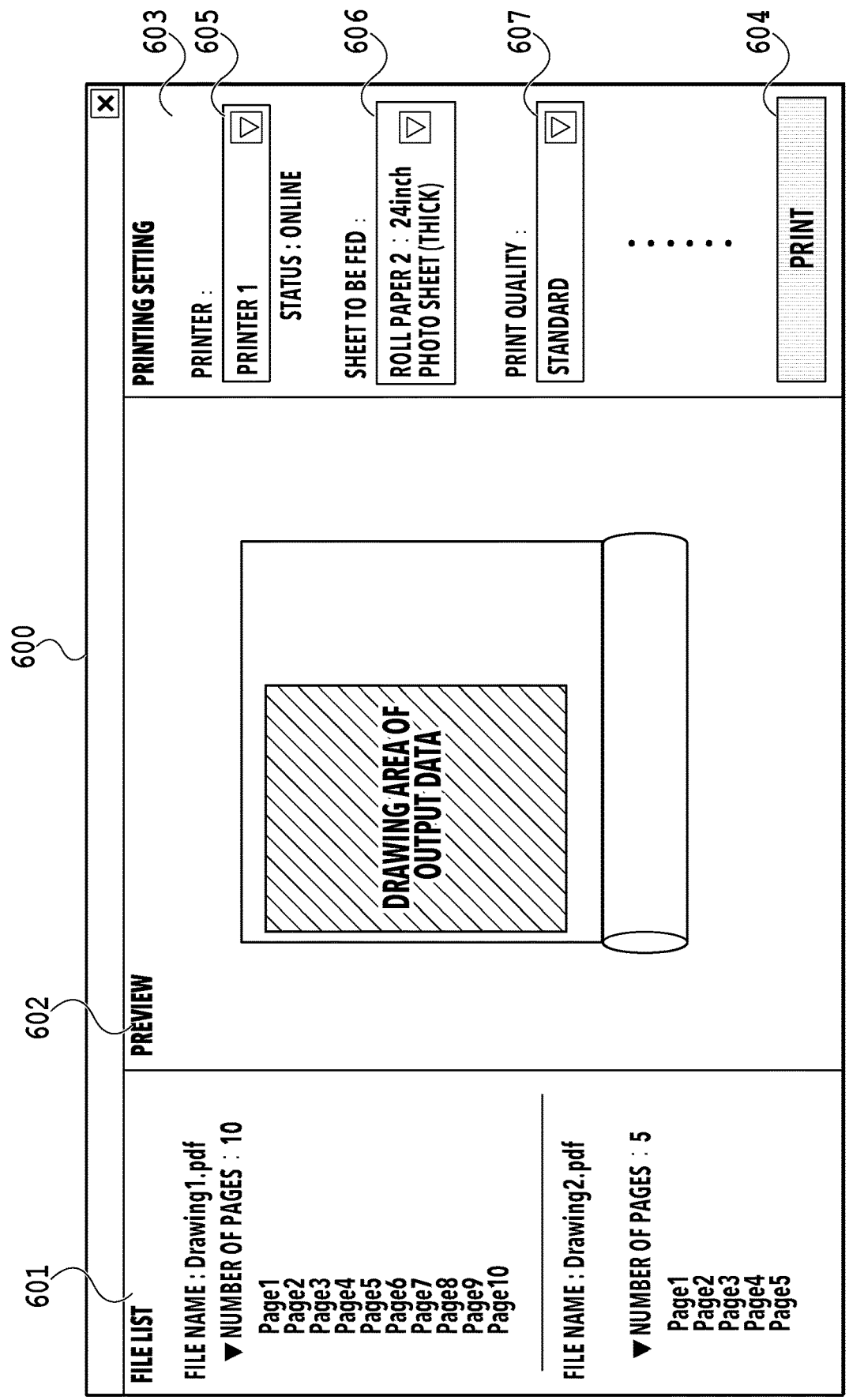
FIG. 6 is a GUI screen for printing setting that is displayed on a display connected to the PC 101.

FIG. 6 is a diagram showing an example of the GUI screen of a printing application for a user to perform printing setting and a case is shown where "Printer 1" corresponding to the image output apparatus 100 in FIG. 1 is designated as the printer of the output destination. This GUI screen is displayed on the display 309 connected to the PC 101.

As shown in FIG. 6, the GUI screen 600 has a file list display section 601, a preview display section 602, a printing setting display section 603, and a printing execution button 604.

In the file list display section 601, a list of printing-target document files and a list of pages included in the document are displayed and the file name and the number of pages are displayed as information relating to the document. It is possible for a user to select a preview display target, limit the printing target, and so on by selecting the page for each document that is displayed in the file list display section 601.

In the preview display section 602, the print layout of the page selected via the file list display section 601 is preview-displayed.

In the printing setting display section 603, information relating to the printing setting is displayed, which is generated based on the information stored in the table shown in FIG. 5. The printing setting display section 603 has a first pulldown list 605 for selecting the printer of the output destination, a second pulldown list 606 for selecting the sheet to be fed, and a third pulldown list 607 for selecting print quality.

In a case where the printing execution button 604 is pressed down by a user, creation of a print job with contents that are set via the GUI screen 600 and transmission of the created print job to the image output apparatus 100 are performed.

The GUI screen shown in FIG. 6 is an example and the GUI screen may have an element other than the elements described previously.

<Acquisition Processing of Printing Setting Information>

Figure 7:
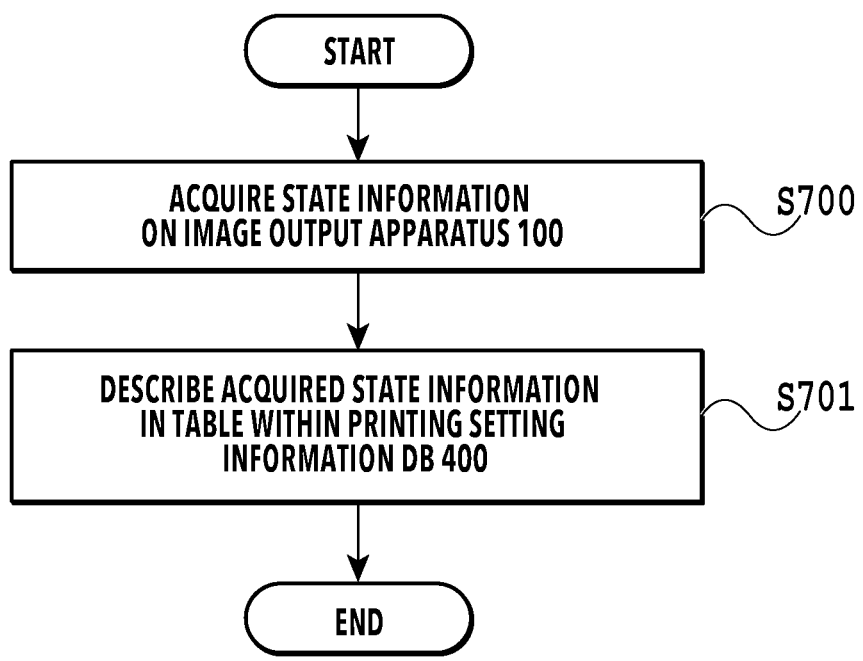
FIG. 7 is a flowchart of processing for the PC 101 to acquire printing setting information in the image output apparatus 100.

FIG. 7 is a flowchart showing an example of processing to acquire printing setting information, which is performed by the PC 101. The following processing is started with activation of the printing application installed in the PC 101 as a trigger.

At step S700, the information acquisition unit 401 acquires state information for each of the image output apparatuses 100, which includes the sheet feed situation and the like, by communicating with the one or a plurality of the image output apparatuses 100 connected with the PC 101. As described previously, this state information is stored in advance within the image output apparatus 100 by the device information storage unit 405. In the following, for simplicity, "step S-" is abbreviated to "S-".

At S701, the information acquisition unit 401 describes the state information on the image output apparatus 100, which is acquired at S700, in the table stored in the printing setting information DB 400 and the series of processing is terminated. After this step, the state is brought about where the values of the setting items 500 to 504, 506 are described among the seven setting items within the table shown in FIG. 5. The above is the contents of the acquisition processing of the printing setting information.

<Generation of Automatic Flag Value and Storage Processing>

Figure 8:
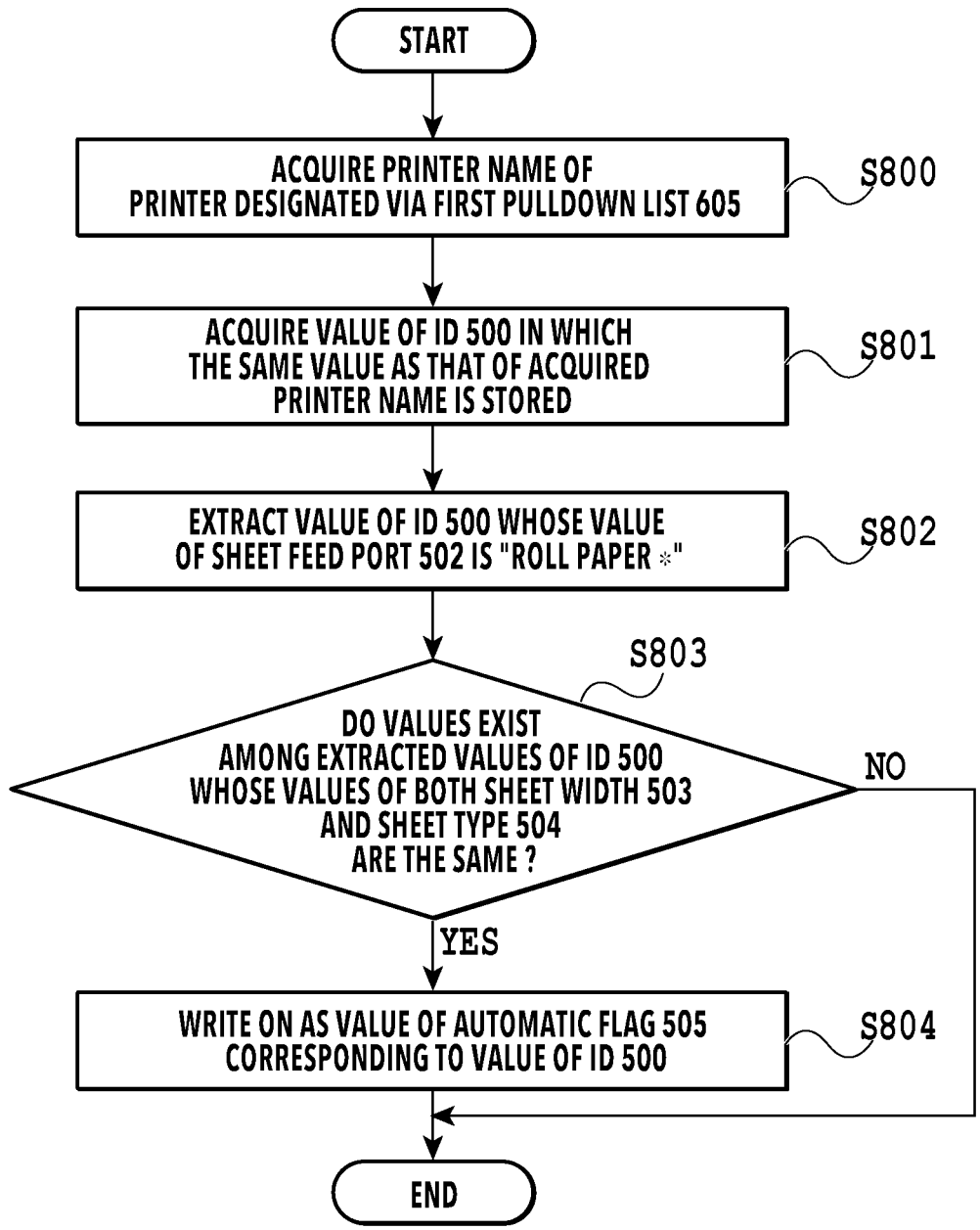
FIG. 8 is a flowchart of processing for the PC 101 to generate and store an automatic flag value.

FIG. 8 is a flowchart showing an example of processing to generate and store an automatic flag value as preliminary processing for generating sheet feed information that is displayed in the second pulldown list 606. Here, it is assumed that the following processing is started in a case where a printer is designated by a user via the first pulldown list 605 (see FIG. 6).

At S800, the information comparison unit 402 acquires the printer name of the printer designated via the first pulldown list 605.

At S801, the information comparison unit 402 acquires the value of ID 500 in which the same value as that of the printer name acquired at S800 is stored by searching the column of Printer Name 501 within the table in FIG. 5. For example, in a case where the printer name acquired at S800 is "Printer 2" shown in FIG. 5, the values of ID 500 that are acquired at this step are ID-E, ID-F, ID-H, and ID-I.

At S802, the information comparison unit 402 extracts the value whose value of Sheet Feed Port 502 is "Roll *" (* may be an arbitrary character and Roll * indicates that roll paper is set) from the values of ID 500 acquired at S801. For example, in a case where the values of ID 500 acquired at S801 are ID-E, ID-F, ID-H, and ID-I shown in FIG. 5, the values of ID 500 that are extracted at this step are ID-E, ID-F, ID-H, and ID-I.

At S803, the information comparison unit 402 determines whether the values exist among the values of ID 500 extracted at S802, whose values of both Sheet Width 503 and Sheet Type 504 are the same. In a case where the determination results at this step are affirmative, the processing advances to S804. On the other hand, in a case where the determination results at this step are negative, the series of processing is terminated. For example, a case is discussed where the values of ID 500 extracted at S802 are ID-E, ID-F, ID-H, and ID-I shown in FIG. 5. In this case, as regards ID-E, ID-F, and ID-G, the value of the sheet width is 24 in. and the value of the sheet type is plain paper, and therefore, both the values of Sheet Width 503 and Sheet Type 504 are the same. Consequently, the determination results at this step are affirmative.

At S804, the information comparison unit 402 updates the table by describing ON as the value of Automatic Flag 505 corresponding to the values of ID 500 whose values of both Sheet Width 503 and Sheet Type 504 are determined to be the same at S803. FIG. 5 shows that ON is described as each value of Automatic Flag of ID-E, ID-F, and ID-G as a result of this step.

As described previously, in the present embodiment, the start trigger of the series of processing is printer designation via the first pulldown list 605, but the start trigger is not limited to this. For example, at timing at which the value of the setting item other than Automatic Flag 505 among the setting items in the table shown in FIG. 5 is described as a result of the PC 101 communicating with the image output apparatus 100, generation of the automatic flag value and storage processing may be started. The above is the contents of generation of the automatic flag value and storage processing.

<Display of Sheet Feed Information Based on Automatic Flag Value>

FIG. 9 is a diagram showing sheet feed information that is displayed in a case where ∇ on the right side within the second pulldown list 606 is pressed down in the state where Printer 2 (see FIG. 5) is selected in the first pulldown list 605, as a display example of sheet feed information. As shown schematically, information for each sheet type is displayed, which is associated with the value of ID 500 whose value of Printer Name 501 is the same as that of the printer name (here, Printer 2) selected via the first pulldown list 605.

At this time, as regards the sheet type associated with the value of ID 500 whose value of Automatic Flag 505 is blank, that is, whose value of Automatic Flag 505 is not described, the item of the contents based on the value of Sheet Feed Port 502 is displayed for each sheet type. In this example, "Roll Paper 4: A2 Plain Paper" and "Roll Paper 5: 24 in. Coated Paper" are displayed.

In contrast to this, as regards the sheet type that is mounted in common at the sheet feed port whose each value of Automatic Flag 505 is ON, as shown in FIG. 9, the display is such that the items are integrated into one item for the GUI. It is possible for a user to designate the sheet feed ports whose automatic flag value is ON at a time by using this one displayed item. In this example, the automatic flag value of each of ID-E, ID-F, and ID-G is ON, and therefore, as the contents relating to the sheet type associated with these ID values, the item "Roll Paper Automatic: 24 in. Plain Paper" is displayed.

<Creation Processing of Print Job>

Figure 10:
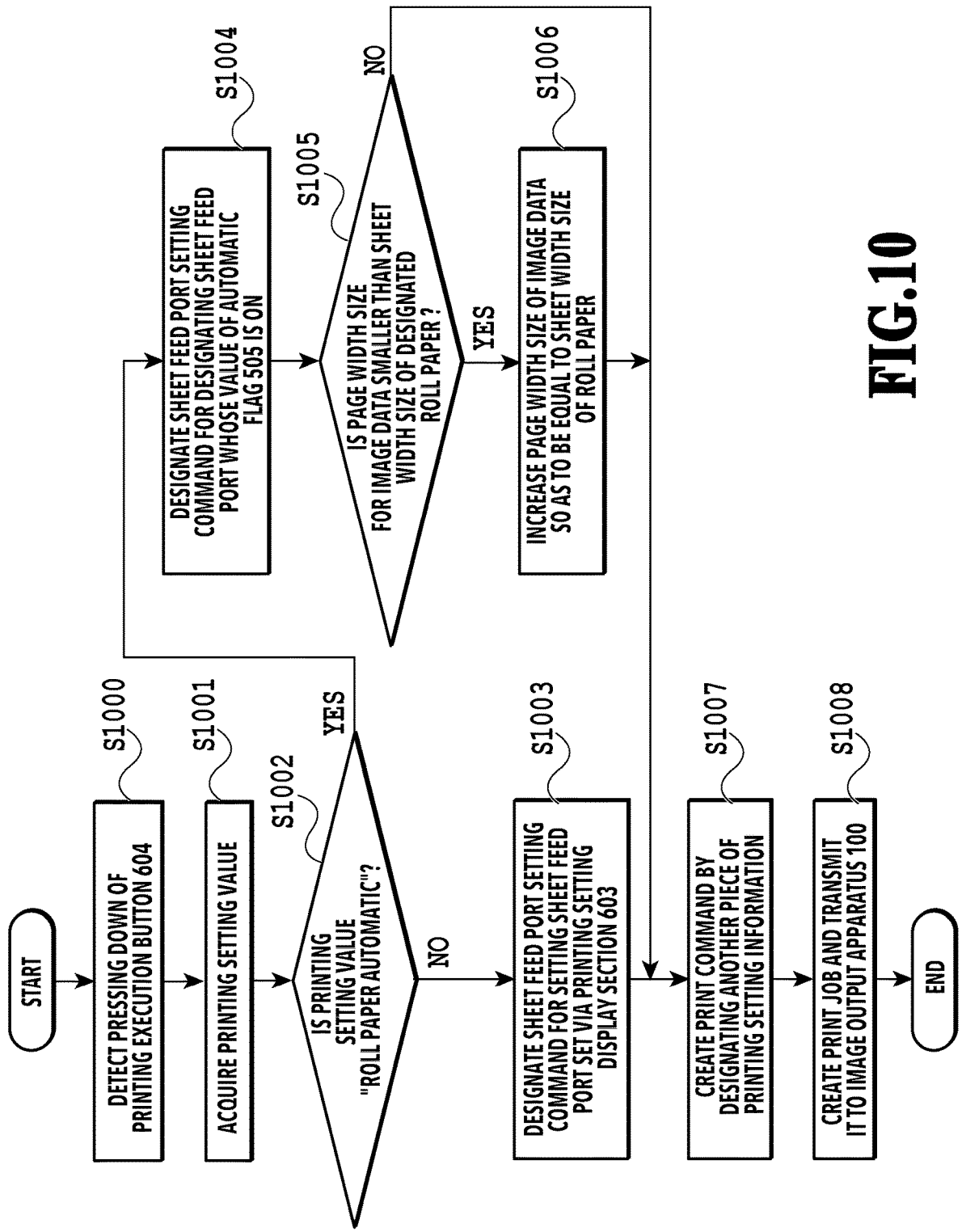
FIG. 10 is a flowchart of processing for the PC 101 to create a print job and transmit the print job to the image output apparatus 100.

FIG. 10 is a flowchart showing an example of processing in which the PC 101 creates a print job and transmits the created print job to the image output apparatus 100. The processing shown in FIG. 10 is started in a case where the printing execution button 604 is pressed down by a user.

At S1000, the information display unit 403 detects pressing down of the printing execution button 604 by a user and requests the print job transmission unit 404 to create a print job.

At S1001, the print job transmission unit 404 acquires the printing setting value that is set by a user via the printing setting display section 603.

At S1002, the print job transmission unit 404 determines whether the value that is set via the second pulldown list 606 among the printing setting values acquired at S1001 is "Roll Paper Automatic: . . . ". "Roll Paper Automatic: . . . " means that continuous printing is performed in which sheets are fed across a plurality of sheet feed ports. That is, in this continuous printing, at the time of performing printing by feeding sheets from the first sheet feed port, even in a case where the sheets of the first sheet feed port run out on the way of the print job (before printing of the print job is completed entirely), sheets are fed from the second sheet feed port, which is another sheet feed port. Due to this, it is possible to complete printing without interrupting printing. In a case where the determination results at this step are affirmative, the processing advances to S1004. On the other hand, in a case where the determination results at this step are negative, the processing advances to S1003.

At S1003, the print job transmission unit 404 designates the sheet feed port setting command, which is one of the printing setting information that is included in the print job. The sheet feed port setting command is made use of at the time of selecting the sheet feed port that is actually used in the image output apparatus 100. In the present embodiment, as the sheet feed port setting command, a command is designated that directly designates the sheet feed port set by a user via the second pulldown list 606.

At S1004, the print job transmission unit 404 designates the sheet feed port setting command for designating the sheet feed port whose value of Automatic Flag 505 is ON.

At S1005, the print job transmission unit 404 determines whether the page width size for the output-target image data is smaller than the sheet width size of the designated roll paper. In a case where the determination results at this step are affirmative, the processing advances to S1006. On the other hand, in a case where the determination results at this step are negative, the processing advances to S1007.

At S1006, the print job transmission unit 404 increases the page width size for the output-target image data so as to be equal to the sheet width size of the designated roll paper. Details of this step will be described later by using FIG. 11.

At S1007, the print job transmission unit 404 creates a print command by designating another piece of printing setting information.

At S1008, the print job transmission unit 404 creates a print job including the print command created at S1007 and transmits the created print job to the image output apparatus 100.

<Increasing Page Width Size for Output-Target Image Data>

Figure 11:
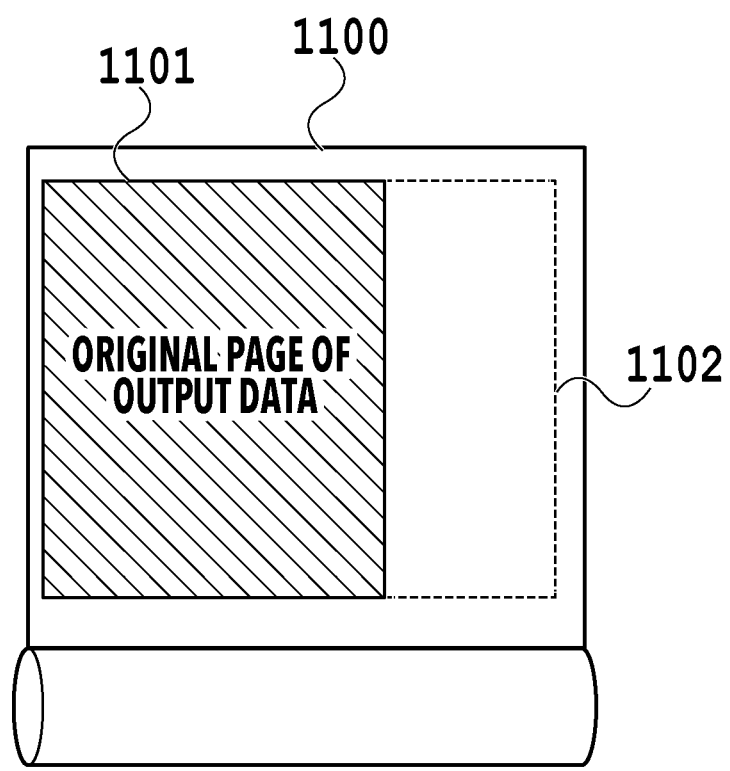
FIG. 11 is a diagram showing an aspect in which the width size of page data is increased so as to be the same as the sheet width size of roll paper.

FIG. 11 is a diagram for explaining processing (S1006 in FIG. 10) to increase the page width size for the output-target image data so as to be equal to the sheet width size of roll paper 1100. This increasing processing is not indispensable to the configuration, but by providing the increasing processing, for example, it is possible to suppress such a problem that an output material that is intended is not obtained in the case as follows.

A case is discussed where the information relating to the sheet feed ports whose value of Automatic Flag is ON is displayed en bloc as shown in FIG. 9 and the sheet feed port setting command for designating the sheet feed ports whose value of Automatic Flag is ON is designated at S1004 in FIG. 10. In the situation such as this and in a case where another roll paper exists whose difference between the page width size for the output-target image data and the sheet width size is further smaller than that of the designated roll paper, the other roll paper is selected with priority on the side of the image output apparatus 100. Consequently, the problem that the output material in accordance with the contents displayed in the preview display section 602 is not obtained occurs, and therefore, the processing to increase the page width size for the output-target image data becomes necessary in order to solve the problem.

In the present embodiment, as shown in FIG. 11, the page width size for the output-target image data is increased by attaching a margin area 1102 to an original page area 1101. Due to this, the page width size for the output-target image data becomes equal to the sheet width size of the roll paper 1100.

Effects of the Present Embodiment

According to the present embodiment, in a case where continuous printing in which sheets are fed across a plurality of sheet feed ports is performed, it is made possible to output an output material in accordance with the intention of a user by suppressing a failure in printing.

Second Embodiment

In the present embodiment, at the time of transmitting a created print job to the image output apparatus 100, the number of sheets necessary for the output of a print job is calculated in the PC 101. After that, in a case where the number of sheets is insufficient based on the calculated number of sheets and the number of remaining sheets in the image output apparatus 100, the PC 101 displays a message to that effect or a message to prompt a user to exchange the roll paper with another. In the following, explanation of the same contents as those of the embodiment described previously is omitted appropriately and contents different from those of the embodiment described previously are explained mainly.

Figure 12B:
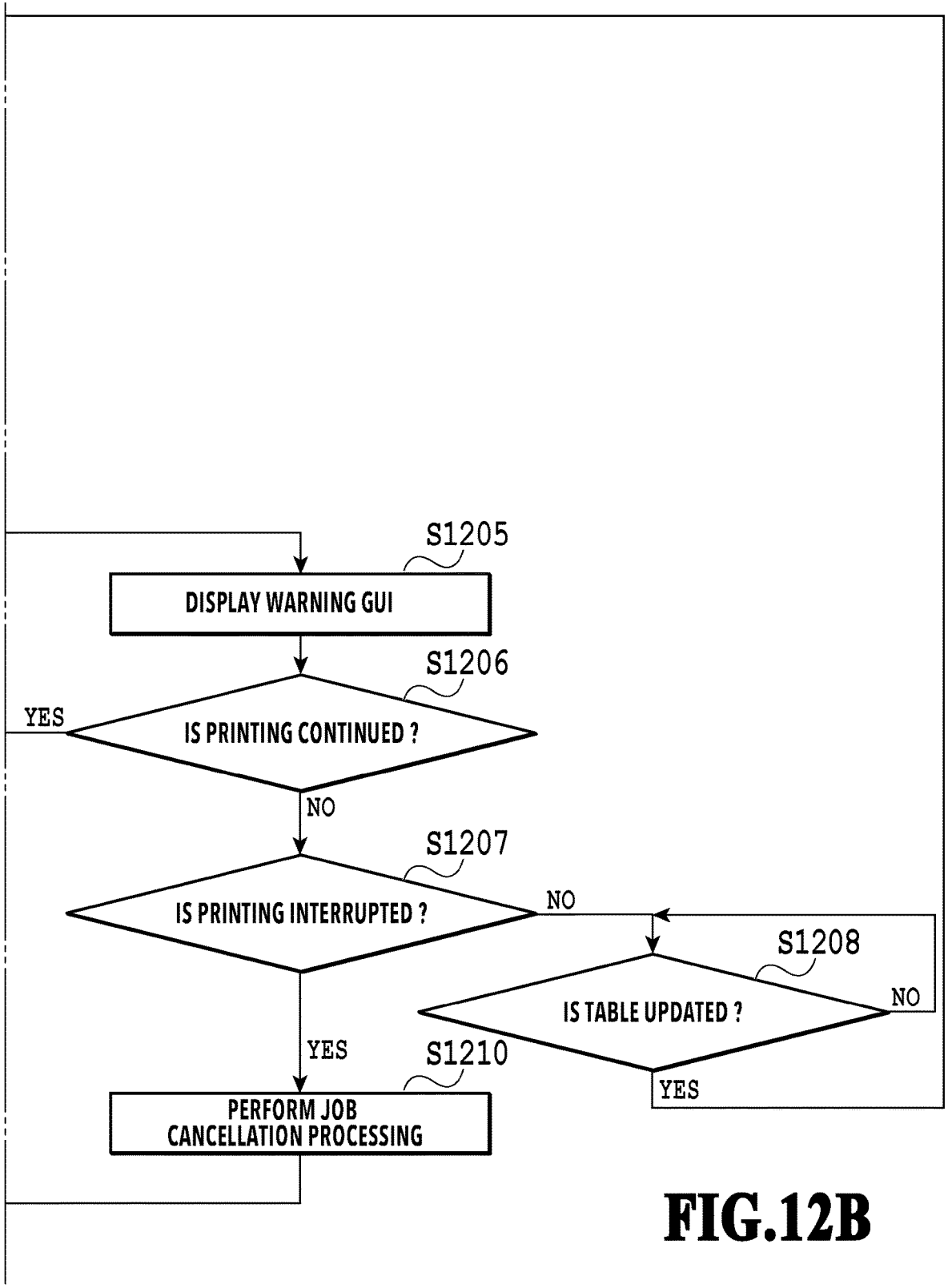

FIG. 12A and FIG. 12B indicate a flowchart of the series of processing accompanied by determination of whether it is possible to output page data of all pages included in a print job with sheets of the size desired by a user, which is performed at the time of transmitting the print job to the image output apparatus 100 (S1008 in FIG. 10).

At S1200, the print job transmission unit 404 searches the inside of the table shown in FIG. 5 and determines whether there is an ID value whose automatic flag value is ON. In a case where the determination results at this step are affirmative, the processing advances to S1201. On the other hand, in a case where the determination results at this step are negative, the processing advances to S1209.

At S1201, the print job transmission unit 404 calculates a sheet length necessary for output based on the printing setting information included in the print job, specifically, the information on the number of pages and the information on the page size.

At S1202, the print job transmission unit 404 takes notice of one unprocessed ID value among the ID values whose automatic flag value is ON (this ID value is called ID value of interest). Then, the print job transmission unit 404 determines whether the relationship in magnitude between the sheet length necessary for output calculated immediately previously (that is, at S1201 or S1204, to be described later) and the number of remaining sheets corresponding to the ID value of interest satisfies formula (1) below. In a case where the determination results at this step are affirmative, the processing advances to S1203 and on the other hand, in a case where the determination results are negative, the processing advances to S1209.

$$\text{number of remaining sheets corresponding to ID value of interest} < \text{sheet length necessary for output} \quad \text{formula (1)}$$

In a case where there is a plurality of ID values whose automatic flag value is ON and the one ID value of interest is determined at this step, it may also be possible to determine order of taking notice based on the sheet feed state of the roll paper at each sheet feed port of the image output apparatus 100. That is, in order to bring about the state where it is possible to print the roll paper, preparation processing, such as increasing tension by moving the tip end of the roll paper to a predetermined position and then rewinding the roll paper, is necessary, and therefore, an embodiment is considered in which the ID value indicating the sheet feed port for which the preparation processing has been completed is taken notice of preferentially. Alternatively, it may also be possible to take notice of the ID value in order from the ID value whose number of remaining sheets is the largest by taking into consideration the value of Number of Remaining Sheets 506 of the table shown in FIG. 5.

At S1203, the print job transmission unit 404 determines whether there is an ID value whose automatic flag value is ON, which is not taken notice of yet at S1202 (that is, unprocessed ID value). In a case where the determination results at this step are affirmative, the processing advances to S1204 and on the other hand, in a case where the determination results are negative, the processing advances to S1205.

At S1204, the print job transmission unit 404 calculates the number of pages that cannot be output with the sheets mounted at the sheet feed port corresponding to the ID value of interest. Then, the print job transmission unit 404 calculates the sheet length necessary to output the number of remaining pages based on the calculated number of pages and the page size information that has also been made use of at S1201. In the loop processing at S1202 to S1204, as a whole, determination of whether the sum of the numbers of remaining sheets mounted at each of the plurality of sheet feed ports designated as the output destination is larger than the sheet length necessary for output is performed.

In a case of NO at S1203, the sheets of the size desired by a user are insufficient in the image output apparatus 100, and therefore, continuing printing in this state will result in that the output material is printed on the sheet whose size is different from the desired size, and therefore, there is a possibility that an output material that is not intended by the user is output. Consequently, in this case, at S1205, the print job transmission unit 404 requests the information display unit 403 to display a warning GUI on the display 309.

Figure 13:
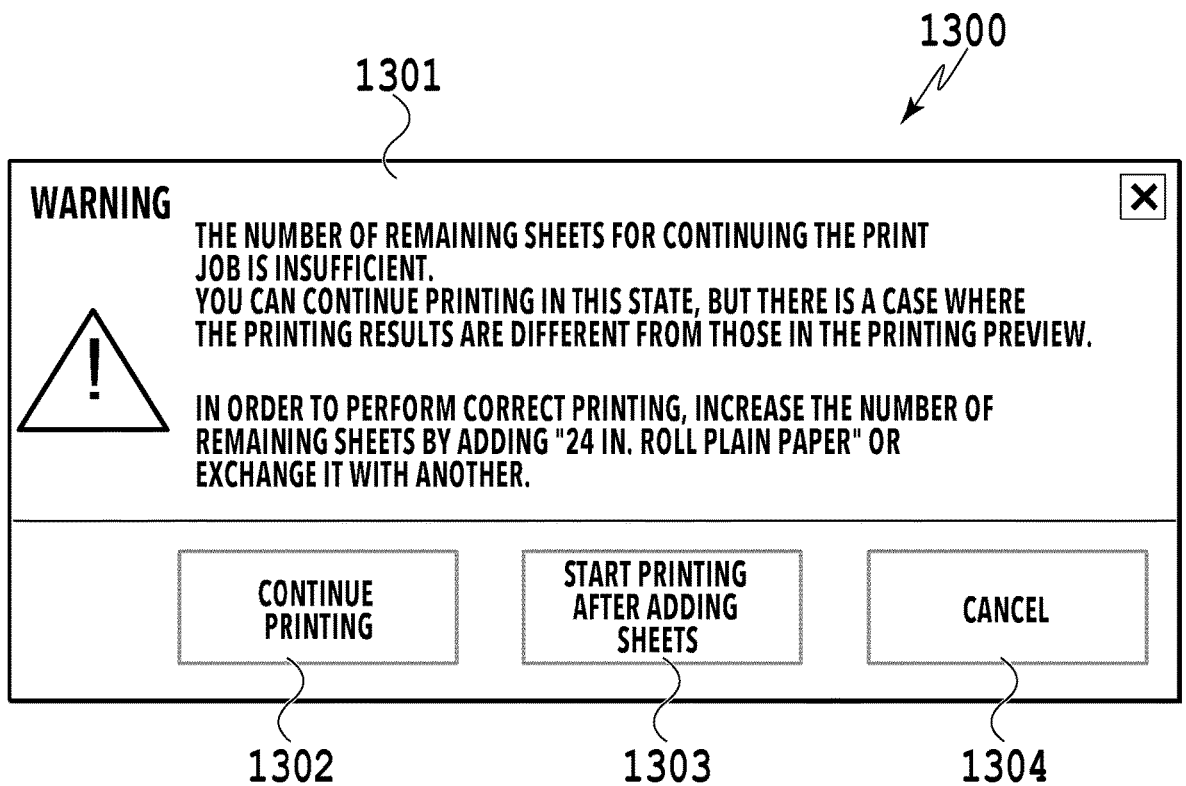
FIG. 13 is a warning message for a notification to the effect that the number of remaining sheets will run short.

FIG. 13 shows a GUI 1300 as an example of a warning GUI that is displayed at S1205. The GUI 1300 has an area 1301 in which a message that warns a user is displayed. Further, the GUI 1300 has a first button 1302 that is pressed down in a case where printing is continued, a second button 1303 that is pressed down in a case where printing is started after adding sheets to the image output apparatus 100, and a third button 1304 that is pressed down in a case where printing is interrupted.

Explanation is returned to FIG. 12 A and FIG. 12B. At S1206, the print job transmission unit 404 determines whether there are instructions to continue printing by a user. In a case where the determination results at this step are affirmative, the processing advances to S1209 and on the other hand, in a case where the determination results are negative, the processing advances to S1207. In the present embodiment, in a case where pressing down of the first button 1302 is detected, it is regarded that there are instructions to continue printing and the processing advances to S1209. On the other hand, in a case where pressing down of the second button 1303 or the third button 1304 is detected, it is regarded that there are not instructions to continue printing and the processing advances to S1207.

At S1207, the print job transmission unit 404 determines whether there are instructions to interrupt printing by a user. In a case where the determination results at this step are affirmative, the processing advances to S1210 and on the other hand, in a case where the determination results are negative, the processing advances to S1208. In the present embodiment, in a case where pressing down of the third button 1304 is detected, it is regarded that there are instructions to interrupt printing and the processing advances to S1210. On the other hand, in a case where pressing down of the second button 1303 is detected, it is regarded that there are not instructions to interrupt printing (in other words, there are instructions to start printing after addition of sheets) and the processing advances to S1208.

The case of NO at S1207 means that a user selects an option to start printing after adding sheets that are lacking to the image output apparatus 100. Consequently, in this case, the PC 101 stands by until a user adds sheets that are lacking to the image output apparatus 100. In detail, at S1208, the print job transmission unit 404 determines whether the table shown in FIG. 5 stored in the printing setting information DB 400 is updated as a result of addition of sheets that are lacking. In a case where the determination results at this step are affirmative, it is regarded that the sheet state in the image output apparatus 100 has changed and the processing advances to S1200. On the other hand, in a case where the determination results at this step are negative, the loop processing is performed.

At S1209, the print job transmission unit 404 transmits the created print job to the image output apparatus 100 and causes the image output apparatus 100 to perform printing processing.

At S1210, the print job transmission unit 404 performs job cancellation processing to delete the created print job.

Effects of the Present Embodiment

As explained above, in the present embodiment, in a case where the number of remaining sheets designated by a user is small in the image output apparatus, the warning GUI is displayed and the user is notified of a warning. Due to this, it is possible for the user to exchange sheets in the image output apparatus or interrupt printing, and therefore, it is possible to suppress a failure in printing.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to one embodiment of the present invention, in a case where a printing apparatus capable of performing printing in which sheets are fed from a plurality of sheet feed ports, it is made possible to output an output material in accordance with the intention of a user by suppressing a failure in printing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-182779 filed Oct. 30, 2020, which is hereby incorporated by reference herein in its entirety.

What is claimed is:

1. A non-transitory computer readable storage medium storing a program for controlling a computer of an information processing apparatus to:

acquire printing setting information including at least information on a sheet type relating to mounted sheets and information on a sheet width, which correspond to each sheet feed unit in a printing apparatus capable of feeding sheets from a plurality of sheet feed units;

a first item for designating a plurality of sheet feed units whose both sheet type and sheet width are the same among sheet feed units of the printing apparatus, and a second item for designating a sheet feed port for which there does not exist another sheet feed unit whose both sheet type and sheet width are the same; and create a print job in a case where a user designates the first item, the print job including a command for the printing apparatus to automatically select a sheet feed unit from among the plurality of sheet feed units included in the first item.

2. The storage medium according to claim 1, further storing a program for controlling the computer to:
determine whether there are sheet feed units whose both sheet type and sheet width are the same among sheet feed units of the printing apparatus by using the printing setting information.

3. The storage medium according to claim 2, wherein in a case where determination results by the determination unit are affirmative, the first creation unit creates the first item by using the printing setting information.

4. The storage medium according to claim 1, wherein sheets that are mounted at each sheet feed unit of the printing apparatus include roll paper and cut sheets.

5. The storage medium according to claim 1, wherein the GUI has a preview display section in which a print layout is preview-displayed, a first pulldown list for selecting a printing apparatus of an output destination, and a second pulldown list for selecting a sheet to be fed.

6. The storage medium according to claim 1, wherein in a case where another sheet exists whose difference between a page width size for output-target image data and a sheet width size is further smaller than that of a designated sheet, the page width size is increased by attaching a margin area to an original page area.

7. The storage medium according to claim 1, further storing a program for controlling the computer to:
cause a display unit to display a warning GUI to the effect that a designated number of remaining sheets is insufficient based on a relationship in magnitude between the number of remaining sheets and a sheet length necessary for output.

8. The storage medium according to claim 7, wherein in a case where the sheet feed units whose sheet type and sheet width are the same are designated as an output destination via the display item, the display unit displays the warning GUI on a condition that a total number of remaining sheets mounted at each of the sheet feed units whose sheet type and sheet width are the same is smaller than the necessary sheet length.

9. An information processing apparatus comprising:
a memory containing instructions; and
a processor for executing the instructions, wherein the instructions are executed to:
acquire printing setting information including at least information on a sheet type relating to mounted sheets and information on a sheet width, which correspond to each sheet feed unit in a printing apparatus capable of feeding sheets from a plurality of sheet feed units;
create a first item for designating a plurality of sheet feed units whose both sheet type and sheet width are the same among sheet feed units of the printing apparatus, and a second item for designating a sheet feed port for which there does not exist another sheet feed unit whose both sheet type and the sheet width are the same; and
create a print job in a case where a user designates the first item, the print job including a command for the printing apparatus to automatically select a sheet feed unit from among the plurality of sheet feed units included in the first item.

10. A control method of an information processing apparatus, the control method comprising:
a step of acquiring printing setting information including at least information on a sheet type relating to mounted sheets and information on a sheet width, which correspond to each sheet feed unit in a printing apparatus capable of feeding sheets from a plurality of sheet feed units;
a step of creating a first item for designating a plurality of sheet feed units whose both sheet type and sheet width are the same among sheet feed units of the printing apparatus, and a second item for designating a sheet feed port for which there does not exist another sheet fed unit whose both sheet type and sheet width are the same; and
a step of creating a print job in a case where a user designates the first item, the print job including a command for the printing apparatus to automatically select a sheet feed unit from among the plurality of sheet feed units included in the first item.

\* \* \* \* \*